J. H. MERTZ.
Tire-Upsetting Machine.

No. 167,922.

Patented Sept. 21, 1875.

Witnesses
Geo. H. Strong
J. L. Boone

Inventor
John H. Mertz
by Dewey & Co
Attys

UNITED STATES PATENT OFFICE.

JOHN H. MERTZ, OF PASO ROBLES, CALIFORNIA.

IMPROVEMENT IN TIRE-UPSETTING MACHINES.

Specification forming part of Letters Patent No. 167,922, dated September 21, 1875; application filed September 4, 1875.

*To all whom it may concern:*

Be it known that I, JOHN H. MERTZ, of Paso Robles, San Luis Obispo county, State of California, have invented a Tire Upsetter and Punch; and I do hereby declare the following description and accompanying drawings are sufficient to enable any person skilled in the art or science to which it most nearly appertains to make and use my said invention, without further invention or experiment.

My invention relates to certain improvements in that class of machines which are employed to upset or shorten bars of iron, and more particularly wheel-tires.

Figure 1:
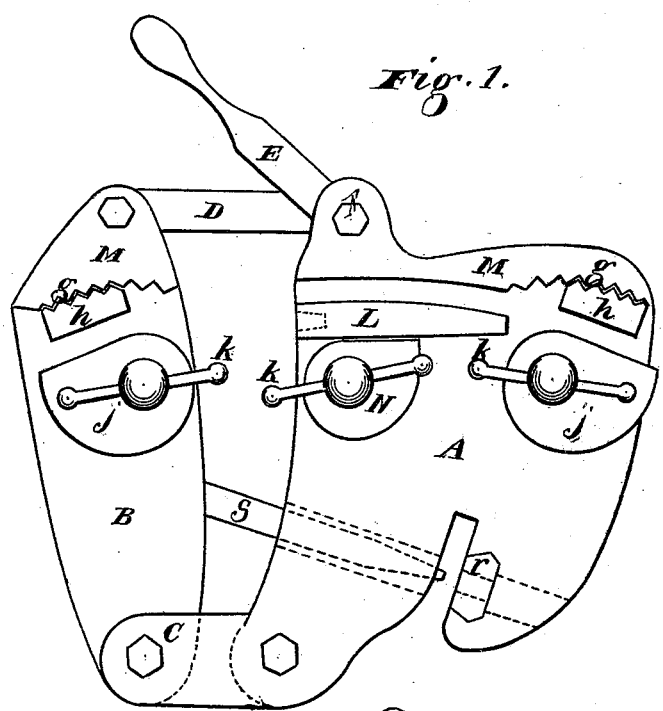
Figure 2:
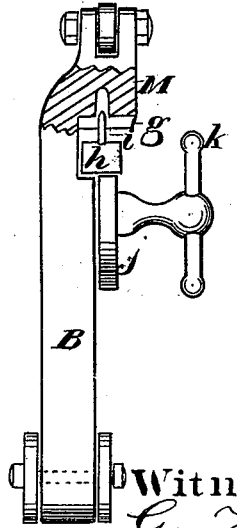
Figure 3:
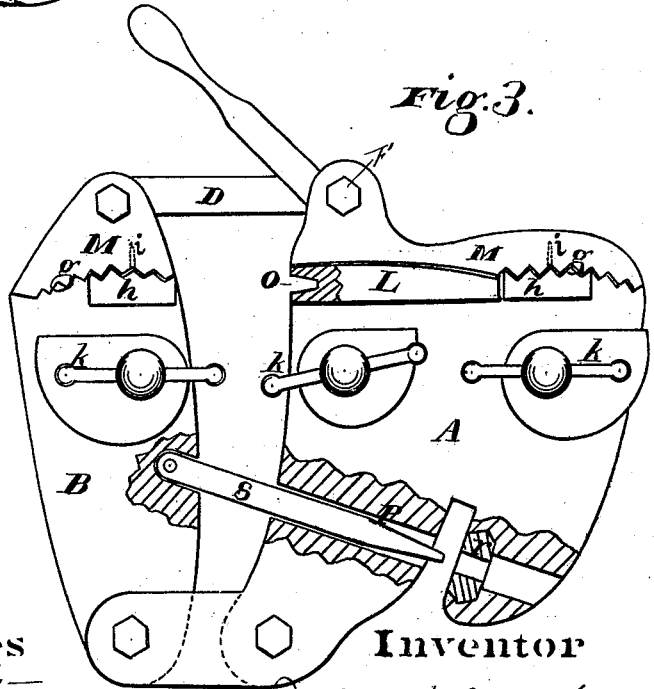

Referring to the accompanying drawing for a more complete explanation of my invention, Figure 1 is a side elevation. Fig. 2 is an end elevation with parts cut away. Fig. 3 is a side elevation with parts cut away.

A is a block of cast-iron, of suitable shape, and fitted to be fastened to a bed so as to lie in a horizontal position. To one side of this block a bed-piece, B, is hinged at C, and its movable end is connected by a bar, D, with the hand-lever E. This is hinged to the block A at F, and by its operation the piece B is moved to or from the block A. Near the hand-lever the parts A and B have a stout projection each at M as deep as the width of a tire, and these projections are grooved or corrugated at $g\ g$ to receive the steel jaws $h\ h$, the backs of which fit the grooves $g$ and are held at any desired point by them and the pin $i$, which is made to fit holes perforated in the faces of the projections. By moving these jaws to different points they will fit any curvature of tire or straight bars, when desired. The tire is laid against the faces of the two jaws $h$, and the cams $j\ j$, one upon each of the parts A and B, are turned around by their levers K until the tire is firmly secured in its place. The heated portion lies in the curve upon the back of the guiding-block L, which retains it between itself and the projection M, so as to prevent it from buckling or bending to one side. This block is held to its place by means of a cam, N, and lever.

When straight bars of iron are to be operated upon the jaws $h$ are moved toward each other, which will place them in a line and also on a line with the face of the guide L. A hole or socket, $o$, is made in the end of the guide L, and this serves to upset bolt-rods previous to their being headed on a die-plate. In this case the rod would be clamped by the jaw $h$ and cam $j$ upon the movable part B. A slot, P, is made in the side of the block A, near the hinge-joint C, and a die, $r$, is fitted into one side of the slot. An opening is made through the part A at right angles with the die, and a punch, S, is attached, so as to be operated by the movement of the part B.

By slipping out the die $r$ the punch S can be removed and any different size substituted.

Having thus described my invention, what I claim, and desire to secure by Letters Patent, is—

1. The parts A and B, having the curved corrugated projection M, in combination with the adjustable jaws $h$ and the cams $j$, the whole constructed to operate substantially as herein described.

2. In combination with the parts A B, with their adjustable jaws $h$ and cams, as shown, the guide L for straight or curved work or bolt-upsetting, substantially as herein described.

JOHN HARRISON MERTZ.

Witnesses:
WILLIAM HENRY AHRENS,
FREDERIC L. SMITH.